US008887773B2

(12) United States Patent
Cottard et al.

(10) Patent No.: US 8,887,773 B2
(45) Date of Patent: Nov. 18, 2014

(54) DEVICE FOR LOADING SOLID PARTICLES INTO A CHAMBER

(75) Inventors: Bernard Cottard, Saint Roman de Colbosc (FR); Pascal Leroy, Montivilliers (FR); Vincent Mayeur, Honfleur (FR)

(73) Assignee: Total Raffinage Marketing, Puteaux (FR)

(*) Notice: Subject to any disclaimer, the term of this patent is extended or adjusted under 35 U.S.C. 154(b) by 199 days.

(21) Appl. No.: 13/515,725

(22) PCT Filed: Dec. 2, 2010

(86) PCT No.: PCT/FR2010/052593
§ 371 (c)(1),
(2), (4) Date: Oct. 17, 2012

(87) PCT Pub. No.: WO2011/083222
PCT Pub. Date: Jul. 14, 2011

(65) Prior Publication Data
US 2013/0025739 A1 Jan. 31, 2013

(30) Foreign Application Priority Data
Dec. 21, 2009 (FR) .................................... 09 59289

(51) Int. Cl.
*B65B 1/04* (2006.01)
*B65G 1/00* (2006.01)
*B01J 8/00* (2006.01)
*B65G 69/04* (2006.01)

(52) U.S. Cl.
CPC ........ *B01J 8/002* (2013.01); *B01J 2208/00778* (2013.01); *B01J 2208/00752* (2013.01); *B01J 8/003* (2013.01); *B65G 69/0458* (2013.01)
USPC ................. 141/286; 141/67; 141/1; 239/682; 239/687; 414/301

(58) Field of Classification Search
CPC .. B01J 8/002; B01J 8/003; B01J 2208/00778; B01J 2208/00929
USPC ........ 141/1, 67, 286; 414/301, 808, 160, 287; 239/681–684, 687, 689, 654
See application file for complete search history.

(56) References Cited

U.S. PATENT DOCUMENTS 3,298,748 A 1/1967 Hultgren
4,433,707 A * 2/1984 Farnham .......................... 141/1
(Continued)

OTHER PUBLICATIONS

International Search Report for PCT/FR2010/052593 dated Jun. 6, 2011.

*Primary Examiner* — Timothy L Maust
*Assistant Examiner* — Timothy P Kelly
(74) *Attorney, Agent, or Firm* — Sughrue Mion, PLLC

(57) ABSTRACT

The invention relates to a device for loading solid particles into a vessel, comprising:
 a means for supplying solid particles to be distributed, said means pouring said solid particles into a supply pipe (1),
 a movable assembly (2) arranged below the supply pipe (1), comprising a central shaft (3) and deflector elements (5) which are integral in rotation with said shaft and arranged around the shaft on multiple vertical tiers (E1-E4) and are articulated about it in such a way that they can lift up,
 a supply pipe (1) surrounding at least partially said central shaft and comprising at least one orifice (4) for discharging the solid particles which is arranged on a side and/or horizontal wall,
this device being characterized in that the movable assembly (2) is designed in such a way as to allow adjustment of the position of the deflector elements (5) on the central shaft (3) in order to vary its permeability to the solid particles.

13 Claims, 6 Drawing Sheets

(56) References Cited

U.S. PATENT DOCUMENTS

| | | | |
|---|---|---|---|
| 4,564,328 A * | 1/1986 | Loutaty et al. | 414/301 |
| 5,238,035 A | 8/1993 | Poussin et al. | |
| 5,244,129 A * | 9/1993 | Poussin et al. | 222/410 |
| 5,296,202 A | 3/1994 | Souers et al. | |
| 5,687,780 A | 11/1997 | Minami | |
| 5,758,699 A * | 6/1998 | Haquet et al. | 141/286 |
| 7,878,428 B2 * | 2/2011 | Pinon et al. | 239/684 |
| 2008/0219817 A1 | 9/2008 | Halland et al. | |
| 2012/0237322 A1 * | 9/2012 | Toline et al. | 414/299 |

\* cited by examiner

DEVICE FOR LOADING SOLID PARTICLES INTO A CHAMBER

The invention relates to a device for loading solid particles into a vessel which makes it possible in particular, by adjusting the permeability of the movable assembly required to disperse the particles, to improve the shape of the loading profiles of the vessel depending on the rotational speed of said movable assembly.

The invention relates more particularly to the loading of fixed-bed reactors, especially those used in the chemical, electrochemical, oil or petrochemical industries, with divided solid particles which can, for example, take the form of spheres, granules, cylinders, pellets, rods or any other form and which generally are relatively small in size.

The particles can in particular be molecular sieves or granules of solid catalysts, generally extruded, which either have an irregular shape or are in the form of mono- or multi-lobed rods or spheres, the dimensions of which can vary depending on circumstances from a few tenths of a millimeter to a few centimeters.

Reference will be made more particularly in the remainder of this description to this so-called application of "dense loading" catalyst granules into a chemical reactor but the device according to the invention can be applied to the loading of any other type of solid particles into any type of vessel.

"Dense loading" is understood to mean in the sense of the present invention optimized loading with a sprinkling effect so that the maximum amount of solid particles can be loaded homogeneously and as uniformly as possible into a minimum amount of space within a minimum amount of time.

A certain number of methods and devices are known which make it possible to increase the density of a fixed bed of catalyst particles in a chemical reactor. These methods have in common that the particles to be loaded are introduced from the top of the reactor and that as the individual particles drop down they collide with fixed or movable mechanical deflectors which cause said particles to be diverted in a random fashion. The particles which have been deflected from their downward path as they drop ideally fall individually and freely with a sprinkling effect over the entire surface of the filling front where they form a dense and homogeneous deposit.

The Applicant, as part of its attempts to optimize these systems for loading reactors, has developed a filling device that makes it possible, by virtue of a movable assembly intended to disperse the solid particles and which comprises flexible deflectors articulated about a rotary shaft such that they can lift up under the effect of the rotation of the movable assembly, to considerably reduce the steric hindrance of the system of deflectors and to facilitate its installation in the reactors. This basic system is described in patent application EP 0 007 854 and improvements to this filling device are disclosed in applications EP 0 116 246, EP 0 769 462 and EP 1 776 302.

Even when a set of high-performing deflectors is used, the behaviour of the catalyst particles during the filling of the reactor may differ from the ideal behaviour described above. The "filling front", also called the "loading profile", in other words the interface between the catalytic bed and that part of the reactor which has not yet been filled, can sometimes deviate substantially from the horizontal and/or have bumps and/or hollows on said filling front. The catalyst particles, in particular when they have an anisotropic form, can position themselves in favoured directions, thus creating preferred paths for the liquid load and the reactive gas to pass through the catalytic bed. This can result in the reactor operating in an unsatisfactory manner, for example in terms of hydrodynamics, and ultimately can represent a cost for the operator.

The unsatisfactory filling fronts can partly be corrected by modifying the rotational speed of the movable assembly. In general, this rotational speed is increased as the filling proceeds so that the particles are sent as close to the walls as possible. However, the permeability of the movable assembly is highly dependent on the rotational speed: an increase in speed being translated by a marked decrease in permeability. This can result in an absence, in particular a partial one, or a lower density of catalyst particles at certain points of the cross section of the reactor. This absence, for example a partial one, or this lower density can in particular be distributed in a concentric ring relative to the axis of rotation of the movable assembly.

Within the sense of the present invention, the permeability of the movable assembly is defined as the proportion of the weight of the solid particles passing through the said assembly without being deviated by it, over the total weight of particles loaded, and can commonly vary from 0% to 50% by weight.

In the course of its extensive research into the technology of the dense loading of solid particles into a vessel, and in particular granules of catalyst into chemical reactors of different heights and loading diameters, the Applicant has noticed that by modifying the movable assembly, by varying the number of deflectors, the shapes and dimensions of the latter, the vertical spacing between the deflectors and/or their relative positions, it was possible to improve the profiles for a given drop height. However, for a different drop height, these modifications on the contrary result in a deterioration of the profile.

One solution could consist in modifying the deflectors as the filling proceeds. However, this solution entails stopping the loading and an operator going down into the reactor to change the deflectors before the loading can resume. Such a solution is not very practical as it is too long and complex to implement.

The Applicant has discovered that simply by modifying the position of the deflectors, and in particular the distance separating the two upper levels of deflectors, depending on the rotational speed of the movable assembly, it was possible to improve the flatness of the loading profile independently of the drop height of the particles.

The Applicant has thus developed a device which, while it is based on the same principle as the dense loading system (known as "Densicat®") disclosed in EP 0 769 462, and has the same ease of operation and installation in the reactor to be loaded, also makes it possible to improve the loading profiles of any type of reactor.

According to a first aspect, the subject of the present invention is a device for loading solid particles into a vessel, in particular homogeneously and uniformly, comprising:
- a means for supplying solid particles to be distributed, which can be arranged on the upper part of the vessel to be loaded, said means pouring said solid particles substantially vertically into a supply pipe,
- a movable assembly arranged below the supply pipe entirely or partly inside the vessel, comprising a substantially vertical central shaft driven in rotation by a motive means and deflector elements which are integral in rotation with said shaft, are arranged around the shaft on multiple vertical tiers and are articulated about it in such a way that they can lift up, a supply pipe surrounding at least partially said central shaft and comprising at least one orifice for discharging the solid particles which is arranged on a side and/or horizontal wall, this device being characterized in that the movable assembly is designed such that the position of the deflector elements on the central shaft can be adjusted in order to vary its permeability to the solid particles.

The position of the deflector elements on the central shaft is understood to mean the position of these elements in a vertical direction, in other words along the central shaft.

This position can be adjusted by translational movement of the deflector elements in a direction parallel to the axis of the central shaft.

The movable assembly can thus be equipped with at least one movable annular support which supports the deflector elements of at least one tier of deflector elements, this movable annular support being mounted in sliding fashion on the central shaft.

The movable assembly can also comprise a plurality of movable annular supports that slide on the central shaft independently from one another.

The deflector elements of the same tier will preferably be displaced simultaneously.

More precisely and for one type of said adjustment, the movable assembly is designed so as to allow a relative displacement of the two highest tiers of the assembly so that the distance separating these two highest tiers can be modified.

By adjusting the distance between the two highest tiers of the movable assembly, it is possible to modify the permeability of the latter depending on the rotational speed of the assembly and the drop height, which makes it possible to correct the loading profile by improving its flatness.

In a first embodiment, the highest tier is fixed, the other tiers being capable of translational movement along the rotary shaft, integrally with one another.

In a second embodiment, the highest tier is capable of translational movement along the rotary shaft, the other tiers being fixed.

The movable assembly is advantageously equipped with a movable annular support which supports the deflector elements of the highest tier or the deflector elements of the other tiers, this movable annular support being mounted in sliding fashion on the central shaft, and with a fixed annular support which supports the remaining deflector elements.

The relative displacement of the two tiers can thus be obtained very simply.

It could also be envisaged that more than one tier of deflector elements, or even all the tiers, are capable of translational movement. This movability could, for example, be achieved by means of a plurality of movable annular supports sliding on the central shaft, preferably independently of one another. This relative displacement of the movable annular supports can be achieved, and controlled, by the means described below with reference to a single movable annular support. However, other means for controlling the relative displacement of the movable annular supports can be envisaged.

The movable annular support is advantageously connected to the fixed annular support by at least one control rod fixed perpendicularly to said annular supports, said control rod sliding in an orifice provided for this purpose in either the fixed or movable support and being integral with the other fixed or movable support, the distance (d) between the two highest tiers being adjusted by sliding of said control rod.

The device preferably comprises at least two control rods, or alternatively at least three control rods distributed regularly about the central shaft.

The control rods can be provided with stops limiting the maximum spacing between the fixed and movable annular supports.

More particularly, a spring can be mounted around each control rod so that it is compressed when the movable annular support is brought closer to the fixed annular support.

This arrangement has the advantage of only requiring pressure on the movable annular support to control the distance between the two upper tiers, releasing this pressure causing the spacing apart of the two supports under the action of the spring.

The device advantageously comprises means for controlling the relative displacement of the two highest tiers which makes it possible to adjust the distance separating them.

Adjustment of the permeability can thus be effected very simply without having to interrupt the loading of the particles.

In a first variant, these control means can consist of at least one lever which can exert pressure on the movable annular support, the lever comprising a vertical part that slides parallel to the rotary shaft and is articulated with an actuating arm, the free end of the vertical part bearing against the upper face of the movable annular support.

In another variant, the control means can consist of a ring surrounding the supply pipe and sliding along the latter, on which is fixed at least one rod extending parallel to the rotary shaft in the direction of the deflector elements, the free end of the rod being shaped such that it bears against the upper face of the movable annular support, at least one screw bearing on the ring allowing the latter to be displaced vertically.

According to yet another of its aspects, the subject of the invention is a method for loading reactors, in particular those used in the oil, chemical or petrochemical industry, employing the device according to the invention, in which the position of the deflector elements on the central shaft and the rotational speed of the movable assembly are adjusted depending on the loading height in order to improve the flatness of the loading profile.

Adjusting just these two parameters, and possibly the openings of the discharge orifices of the supply pipe, makes it possible to improve the loading profile.

The method according to the invention can be implemented by means of a data-processing system, for example a computer (or a processor) programmed appropriately, this system being configured in order to displace the deflector elements along the central shaft, for example via the means for controlling the relative displacement of the annular supports, and in order to adapt the rotational speed of the central shaft, for example via controlling the driving means of the central shaft.

In a particular embodiment, the distance between the two highest tiers of deflector elements of the device is adjusted.

The distance between the two highest tiers of deflector elements is advantageously at its maximum at the beginning of the loading and at its minimum at the end of the loading.

The distance separating the two highest tiers is, for example, between 0 and 150 mm, preferably between 10 and 75 mm.

The rotational speed of the deflector elements is, for example, between 25 and 250 rpm, preferably between 40 and 200 rpm.

BRIEF DESCRIPTION OF THE DRAWINGS

The invention is now described with reference to the attached drawings which are not limiting and in which.

DETAILED DESCRIPTION OF THE INVENTION

In the loading device of the present invention, the particles of catalyst coming from the supply means, which can be a hopper or the like, fall down under the effect of gravity into the supply pipe, in other words between the inner walls of said supply pipe. The supply pipe comprises at its base at least one discharge orifice situated above the movable assembly and more particularly above the dispersion system formed by the deflectors. The particles thus fall at least partly onto said dispersion system driven in rotation by the central shaft via the discharge orifice.

In addition to a first supply with solid particles being made through the supply pipe above the movable assembly, at least one additional supply can be made. This additional supply can be effected via orifices formed in the supply pipe and arranged on its vertical and/or horizontal walls. Particles can thus fall onto parts of the deflectors that are remote from the driving shaft. This can increase the homogeneity of the distribution of the particles in the vessel at a great distance from the centre axis. A judicious choice of the opening or openings can make it possible to selectively fill densely and homogeneously any portions of the vessel that are offset relative to the axis of the movable assembly.

The motor which drives in rotation the tubular central shaft of the device of the invention is preferably offset relative to this shaft and can be supplied with any compressed gas, for example air or nitrogen. Transmission of the rotary movement of the driving means to the tubular shaft can be effected by any appropriate known means, for example by a belt, a chain, a set of gearwheels or by a combination of these means.

The central shaft used in the present invention can be solid or hollow, as described in EP 1 776 302. This latter feature can offer the advantage of being able to provide a passage through said central shaft, for example and not implying any limitation, in order to house in it apparatus for measuring the progression in the level of the catalytic bed during loading and/or in order to suck up any catalyst dust emitted during this same loading.

Figure 1:
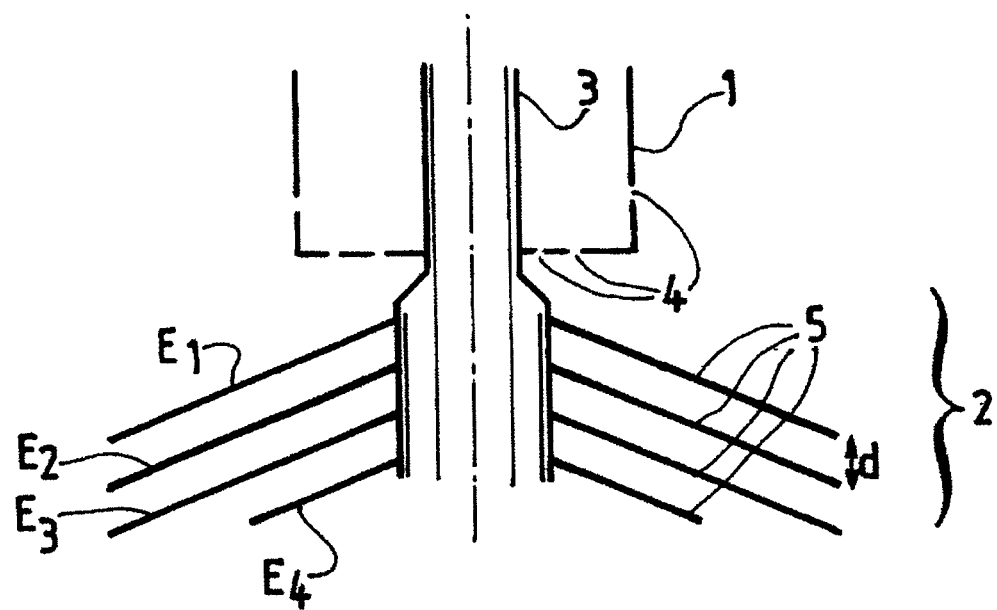
FIG. 1 is a diagrammatic view of a device that is the subject of the present invention.

The device in FIG. 1 comprises a supply hopper (not shown) arranged above the reactor and which supplies by gravity the supply pipe (1) with particles of catalyst.

In this supply pipe (1), the shaft (3) of the movable assembly (2), driven in rotation by a driving means (not shown), is arranged substantially on the longitudinal axis of a circular reactor.

The granules of catalyst fall under gravity via discharge orifices (4) formed in the side and/or horizontal walls of the supply pipe (1), onto the dispersion system consisting of deflector elements (5) fixed to the rotary shaft (3) and distributed over 4 vertical levels along the axis of rotation (3).

The surface area of these discharge orifices (4) can generally be adjusted via a flap (not shown) that slides manually or automatically to block more or less partially the discharge opening according to the required rate of flow of the particles for the loading.

In this FIG. 1, the deflector elements (5) are arranged about the shaft (3) on multiple vertical tiers E1, E2, E3, E4 and articulated on the shaft (3) so that they can lift up under the effect of the rotation of the movable assembly. These deflector elements can be distributed evenly at each tier.

FIGS. 1 to 4 show a device in which the movable assembly is provided with 4 tiers of deflector elements. An assembly could, however, also be envisaged with 2 tiers of deflector elements or more, and preferably with three or four, the fixed tiers being spaced apart from one another by a distance that lies between 2 and 20 centimeters and preferably between 4 and 10 centimeters.

The deflector elements can be formed by strips with longitudinal dimensions that can lie between 10 centimeters and 2 meters, and preferably between 10 cm and one meter. The strips can also have any shape known from the prior art, namely, for example, rectangular, triangular or trapezoidal.

Each tier of deflector elements can comprise at least two deflector elements, preferably from four to twelve and still more preferably eight deflector elements, these deflector elements being arranged about the axis of rotation and preferably having identical shapes. In particular, the Y deflector elements are each arranged at 360/Y° to one another.

The material constituting the strips or the deflector elements can be a semi-rigid material, preferably flexible rubber reinforced by a textile fibre, and its thickness can vary between 2 mm and 10 mm and preferably between 3 and 8 mm.

According to the invention, the movable assembly is equipped with a movable annular support which supports the deflector elements of the highest tier or the deflector elements of the other tiers, this movable annular support being mounted in sliding fashion on the central shaft (3), and with a fixed annular support which supports the remaining deflector elements.

Figure 2:
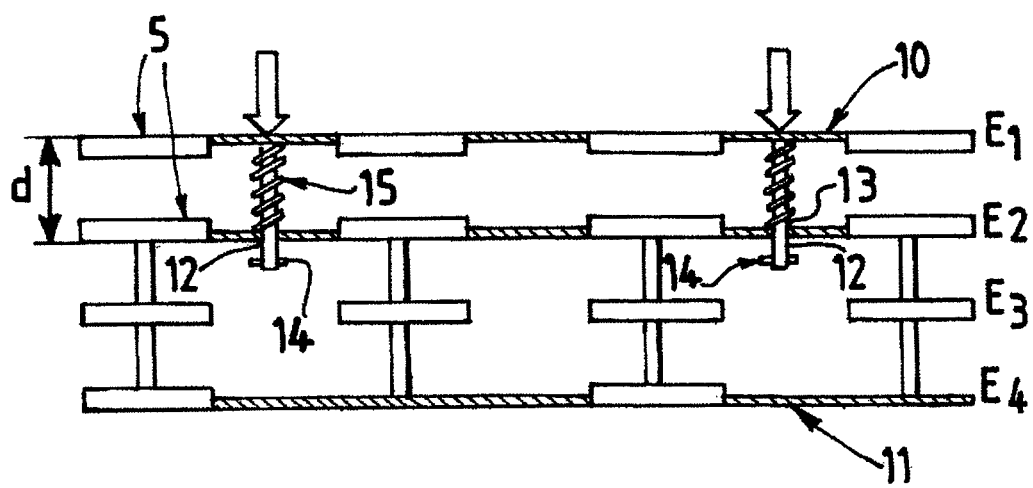
FIG. 2 is a view in profile of the annular supports and the tiers of deflector elements of the movable assembly of a device that is the subject of the present invention.

FIG. 2 shows a particular embodiment in which the movable annular support (10) is that which supports the deflector elements (5) of the highest tier E1 of the movable assembly. The fixed annular support (11) supports the deflector elements of the other tiers, namely of the tiers E2, E3 and E4 in the example shown in FIGS. 1 to 4.

The movable annular support (10) is connected to the fixed annular support (11) by at least two control rods (12) fixed perpendicularly to the annular supports (10, 11).

These control rods (12) project above the tiers of deflector elements. They slide in orifices (13) provided for this purpose in the fixed support (11) and are integral with the movable support (10). Thus the distance (d) between the two highest tiers is adjusted by displacing the control rods (12).

In the example shown, each control rod (12) is provided with a stop (14) limiting the maximum spacing between the fixed and movable annular supports.

A spring (15) is furthermore mounted around each control rod (12) so that it is compressed when the movable annular support is brought closer to the fixed annular support.

This compression of the springs (15) is, for example, achieved by exerting pressure on the movable support (10)

(and/or on the control rods (12) in a direction that brings the movable support and the fixed support closer together). Releasing this pressure then moves the movable support further away under the action of the springs (15).

The distance (d) between the tiers E1 and E2 is thus adjusted very easily. The sliding of the control rods (12) along their axis could also be controlled directly in order to adjust this distance (d).

In a variant that is not shown, it could be envisaged that the annular support (11) of the lower tiers E2, E3 and E4 is movable, the annular support (10) of the upper tier E1 then being fixed. In this case, the control rods (12) slide in orifices provided in the fixed annular support (10) and are integral with the movable annular support (11). Pressure must then be exerted on the control rods (12) or on the annular support (11).

The pressure on the movable annular support can be exerted in different manners.

Figure 3B:
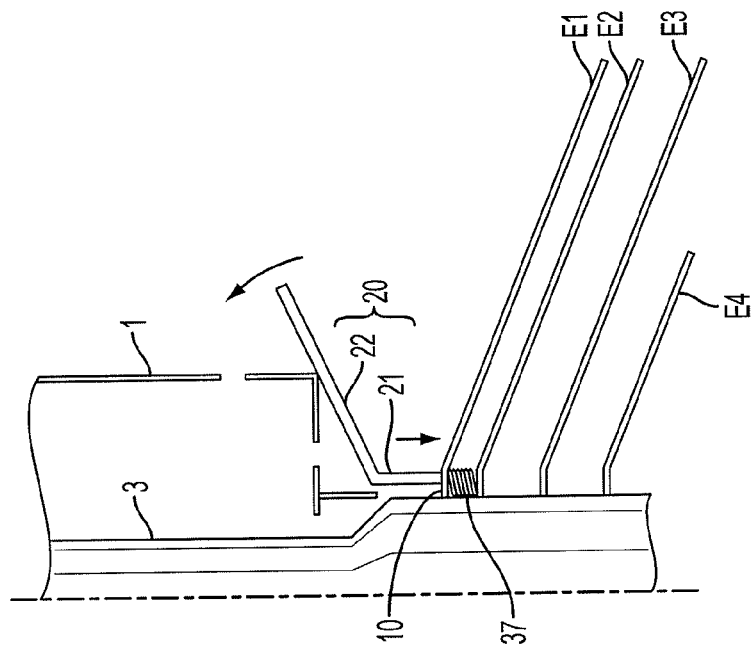
FIGS. 3a and 3b are diagrammatic views of half of the device that is the subject of the invention and is equipped with a first embodiment of the means for controlling the distance between the two upper tiers, the latter being spaced apart in FIG. 3a and brought closer together in FIG. 3b, FIGS. 4a and 4b are diagrammatic views of half of the device that is the subject of the invention and is equipped with a second embodiment of the means for controlling the distance between the two upper tiers, the latter being spaced apart in FIG. 4a and brought closer together in FIG. 4b, FIGS. 5 and 6 show the loaded height of granules of catalysts depending on the radius of the loaded vessel obtained respectively for test 1 and test 2.
Figure 3A:
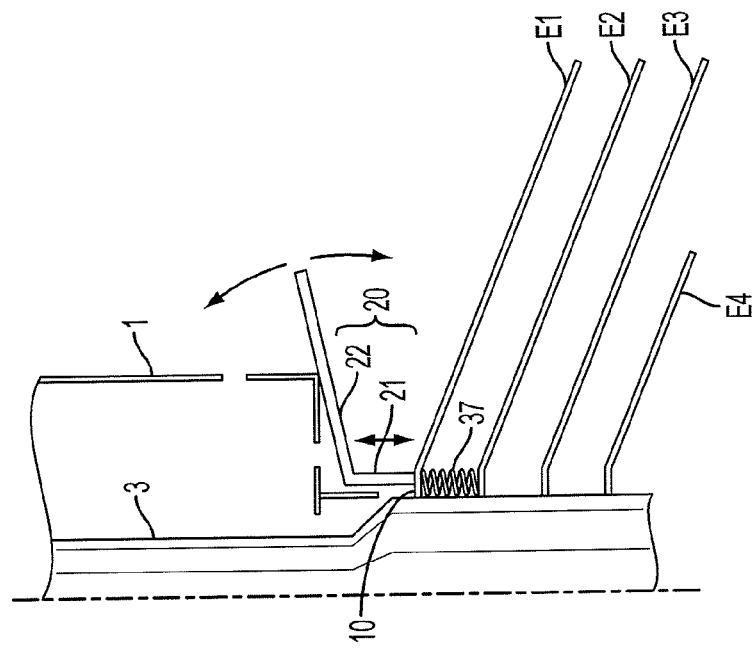

In a first variant, shown in FIGS. 3a and 3b, at least one lever (20) is used which can exert a pressure on the movable annular support (10).

This lever (20) comprises a vertical part (21) which slides parallel to the rotary shaft (3) and is articulated with an actuating arm (22), the free end of the vertical part bearing against the upper face of the movable annular support (10).

The actuating arm (22) extends radially in a direction moving away from the central shaft (3). It is sufficiently long to project from the supply pipe (1) and can bear against the lower end of the latter, as can be seen in FIGS. 3a and 3b.

A return device, of the spring type (37), can optionally be provided for returning the lever into a position in which the distance between the fixed and movable annular supports is at its maximum. This return device is, for example, fixed between the fixed and movable annular supports, as shown in FIG. 3a.

In the example shown, the movable annular support (10) supports the deflector elements of the tier E1. However, it could also be provided that the movable support is the one which supports the deflector elements of the other tiers (E2 to E4).

Figure 4B:
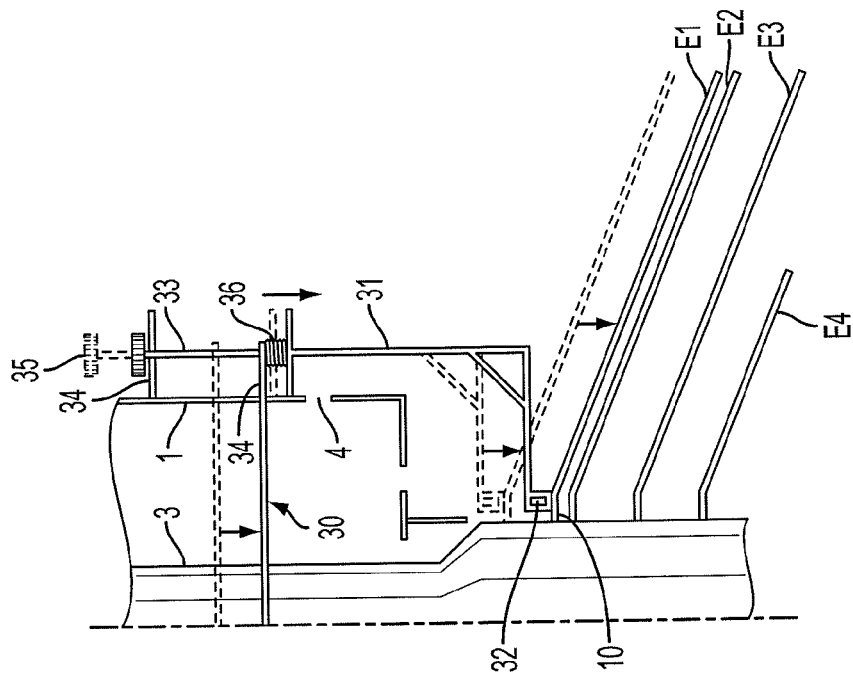
Figure 4A:
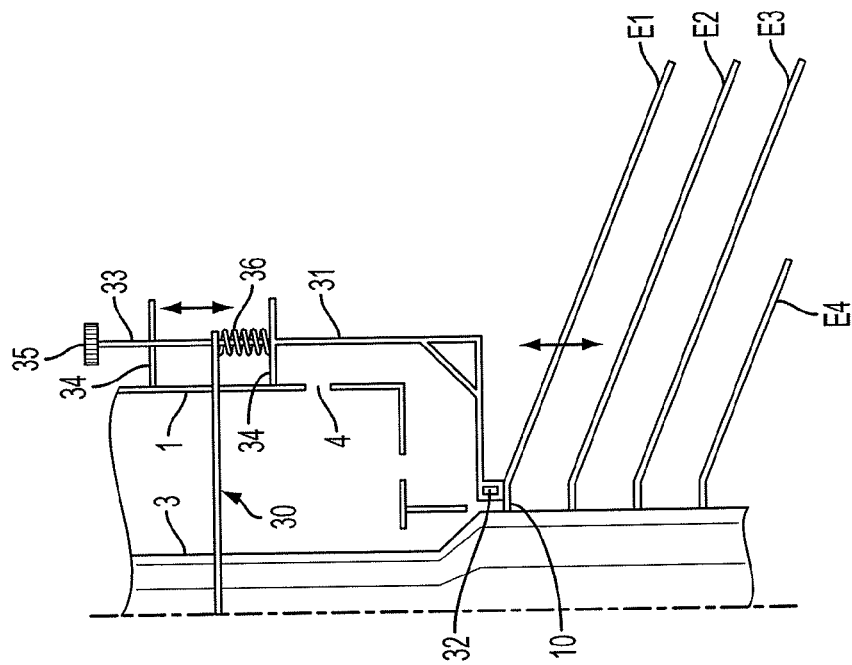

In a second variant, shown in FIGS. 4a and 4b, a ring (30) or collar is used which surrounds the supply pipe (1) and slides along the latter. This ring (30) preferably slides above the highest lateral openings (4) of the supply pipe (1).

On this ring (30), which may be optional, is fixed at least one rod (31), preferably at least two or three rods, extending parallel to the rotary shaft (3) in the direction of the deflectors.

The free end (32) of each rod (31) is shaped such that it bears against the upper face of the movable annular support (10), at least one screw (33), preferably at least two or three screws (33), bearing against the ring (30) allowing the latter to be displaced vertically.

This screw (33) is guided in translational movement by supports (34) integral with the supply pipe (1) on the side wall of the latter, outside the pipe, in a zone situated above the openings (4).

The rising or lowering of the screw (33) can be actuated by means of a wheel (35) or by any other suitable means, for example by hydraulic or pneumatic actuators.

A return spring (36) can also be provided to return the screw (33) into a position corresponding to a maximum distance between the tiers E1 and E2. This spring (36) is, for example, mounted around the screw (33) and arranged between the ring (30) and one of the supports (34) of the rod in such a way that, under the effect of the spring (36), the movable annular support (10) moves away from the fixed annular support of the lower tiers.

These embodiments have been described for a device comprising 4 tiers of deflectors. They can, however, be adapted to devices comprising at least two tiers of deflector elements.

EXAMPLES

The Applicant has employed the device that is the subject of the present invention on a representative model of a typical vessel of a cylindrical chemical reactor used in its refineries.

This model has the following dimensions:
height: 5.00 m,
diameter: 3.80 m,
Conditions Under which the Tests were Carried Out
type of catalyst: $Al_2O_3$ impregnated with an organic liquid in order to obtain a density greater than 0.9,
average dimensions of the granules of catalyst: trilobed in shape, 1.5 mm diameter and average length 3.5 mm,
quantity of catalyst loaded: 2 tonnes,
4 levels of strips,
8 strips per level, 4 on the last tier,
dimensions of all strips: length 55 cm, width at narrowest point 7 cm and widest point 12 cm, thickness 6 mm,
triangular strips as described in EP 0 769 362,
hollow central rotary shaft.
Features for Test 1: Configuration at the End of Loading
The loading was carried out with a movable assembly for which the distance (d) between the tiers E1 and E2 corresponds to the normal distance between the two highest tiers, ie d=50 mm, and with a movable assembly for which the distance (d) between the highest tiers E1 and E2 is adjusted to d=0 mm (superposition of the two tiers).

The conditions under which this test was carried out are as follows:
feed rate of granules of catalyst to the movable assembly: = 30 T/h,
rotational speed of the movable assembly: 120-125 revolutions per minute,
opening of the 9 lateral and 15 horizontal discharge orifices,
loading time: 2 minutes,
drop height of the granules of catalyst: 1.5 meters.

Figure 5:
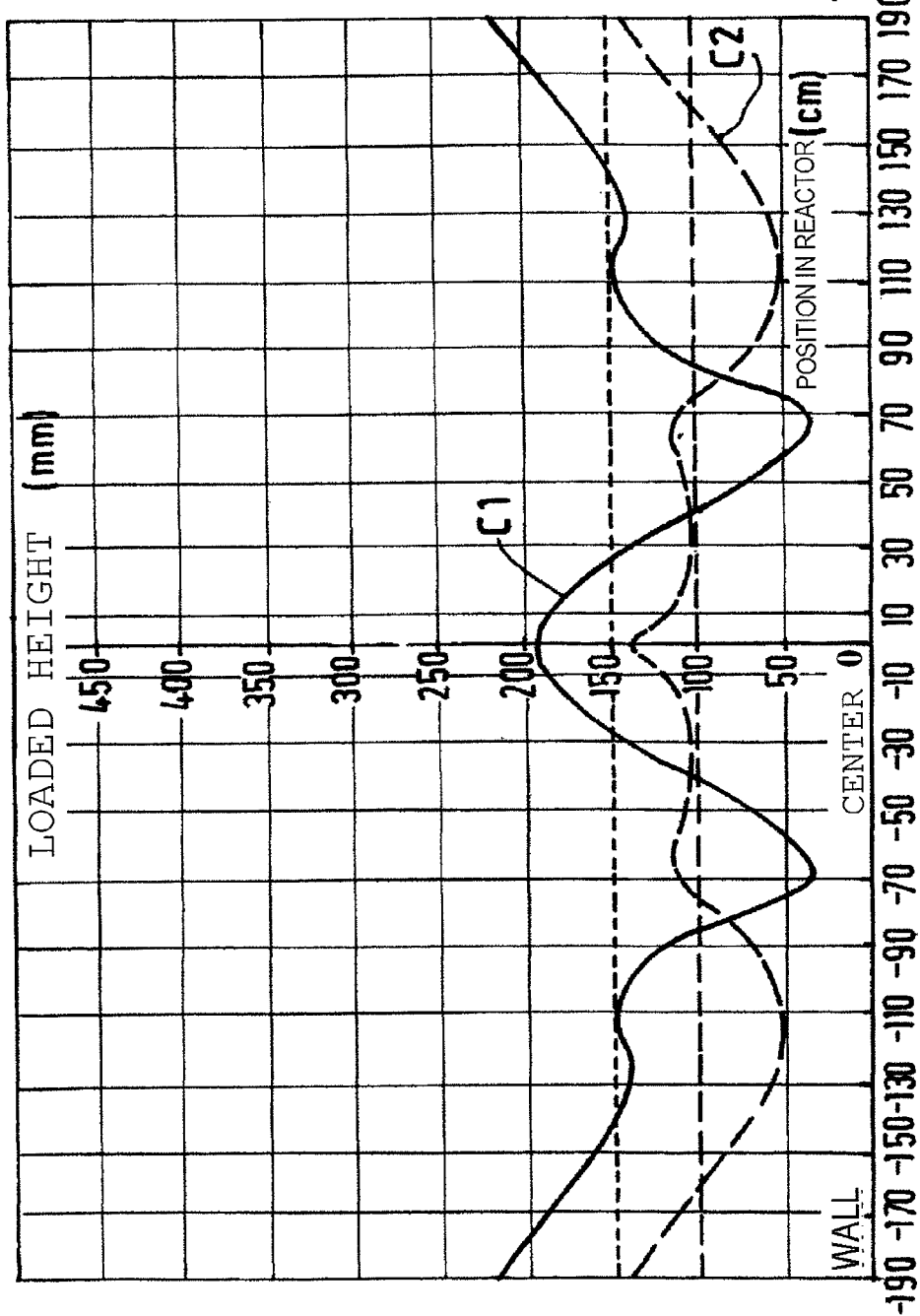

The loading profiles are shown in FIG. 5 in which the height in millimeters of granules of catalyst loaded during the test is on the y-axis and the radius in centimeters of the loaded vessel is on the x-axis. Each of the points that make up the two curves are average values of the heights measured at different locations of the corresponding circumference.

The curve C1 corresponds to the test for which d=50 mm and the curve C2 corresponds to the test for which d=0 mm.

In this FIG. 5, the horizontal line at 150 mm on the y-axis corresponds to the average height of the profile of the curve C1 and the horizontal line at 100 mm on the y-axis corresponds to the average height of the profile of the curve C2. This makes it possible to quantify the loading unevennesses with respect to a theoretical average height.

The increase in the permeability which results from the superposition of the tiers E1 and E2 (curve C2) makes it possible to make up for the unevenness of catalyst that can be seen at r=70 cm on the curve C1. The slight dip in the profile at r=120 cm that is observed for the curve C2 can be corrected by modifying the rotational speed and possibly the openings of the machine.

Features for Test 2: Configuration at the Start of Loading
The loading was carried out with a movable assembly for which the distance (d) between the tiers E1 and E2 corresponds to the normal distance between the two highest tiers, ie d=50 mm, and with a movable assembly for which the distance (d) between the highest tiers E1 and E2 is adjusted to d=73 mm.

The conditions under which this test was carried out are as follows:

feed rate of granules of catalyst to the movable assembly: = 30 T/h,
- rotational speed of the movable assembly: 71-72 revolutions per minute,
- opening of the 15 lateral and 9 horizontal discharge orifices,
- loading time: 2 minutes,
- drop height of the granules of catalyst: 4.3 meters.

Figure 6:
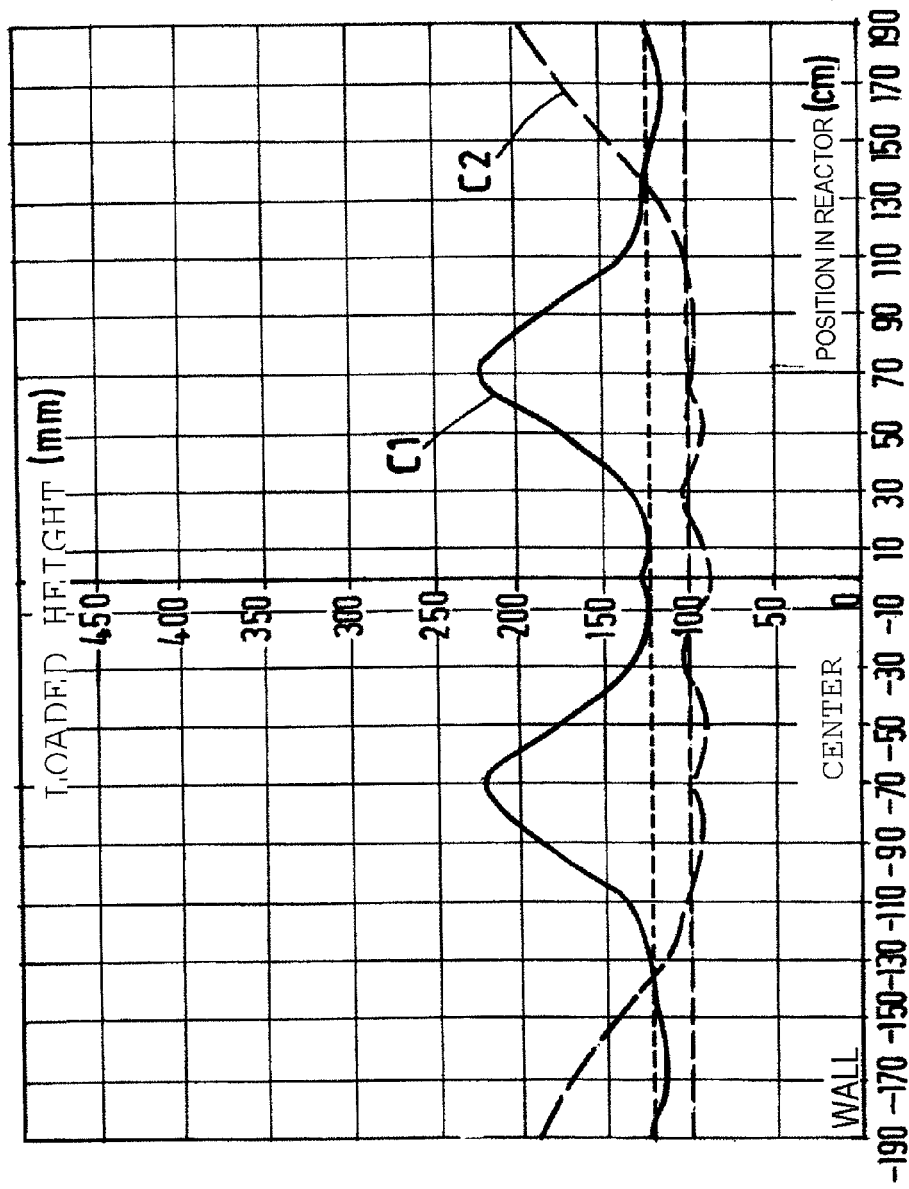
Figure 7:
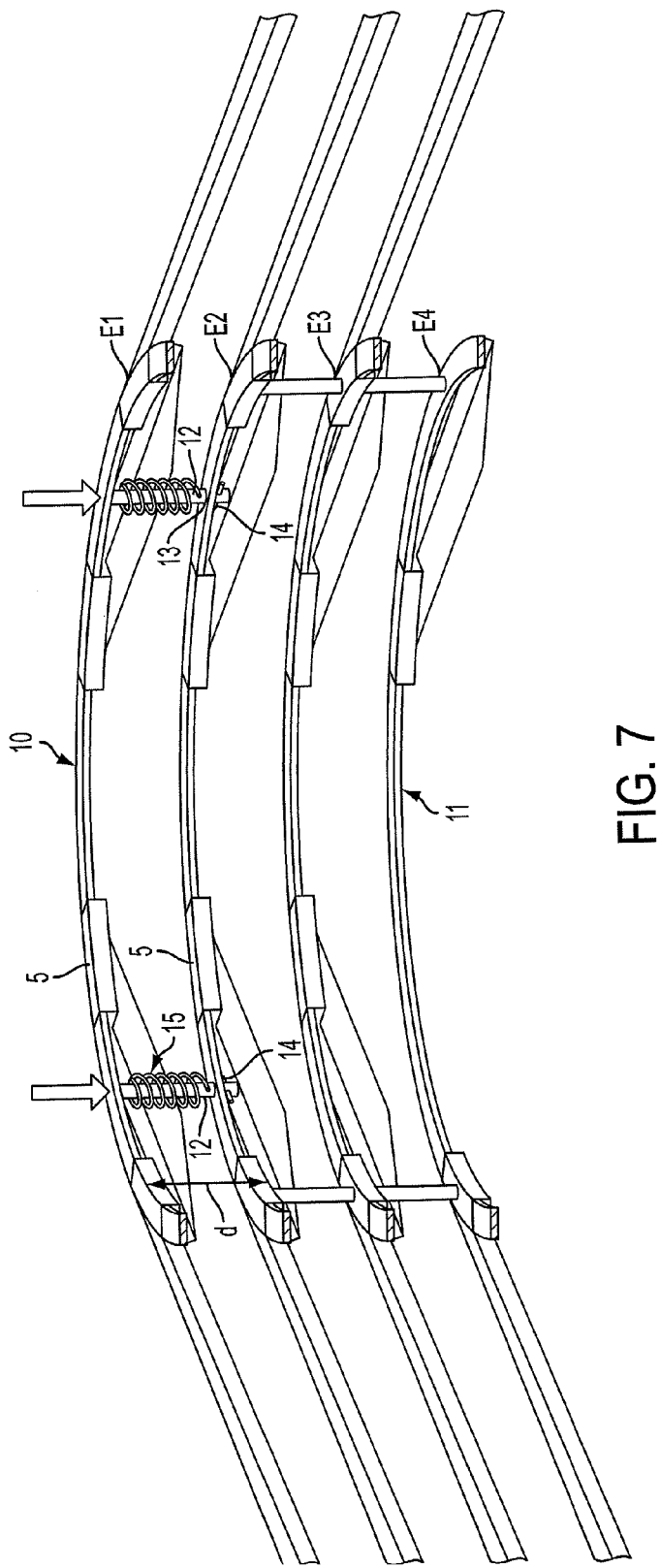
FIG. 7 is a diagrammatic view of the annular supports and the tiers of deflector elements of the movable assembly of a device that is the subject of the present invention.

The loading profiles are shown in FIG. 6 in which the height in millimeters of granules of catalyst loaded during the test is on the y-axis and the radius in centimeters of the loaded vessel is on the x-axis. Each of the points that make up the two curves are average values of the heights measured at different locations of the corresponding circumference.

The curve C1 corresponds to the test for which d=50 mm and the curve C2 corresponds to the test for which d=73 mm.

In this FIG. 6, the horizontal line at 140 mm on the y-axis corresponds to the average of the profile of the curve C1 and the horizontal line at 100 mm on the y-axis corresponds to the average of the profile of the curve C2. This makes it possible to quantify the loading unevennesses with respect to a theoretical average height.

By moving tier 1 away from tier 2, the permeability of the movable assembly reduces, which has the consequence of preventing the over-supply observed at r=70 cm for the curve C1. For the curve C2, the rotational speed is too high, leading to an over-supply of catalyst at the walls.

These tests demonstrate that the use of a device according to the present invention makes it possible to adjust the permeability of the movable assembly of the dispersion device by modifying the distance separating the highest tiers of deflectors (E1 and E2), and improves very noticeably the loading profile of a catalytic bed in a chemical reactor or, by extension, the loading front of solid particles in a vessel.

The invention claimed is:

1. A device for loading solid particles into a vessel, comprising:
    a means for supplying solid particles to be distributed, arranged on an upper part of a vessel to be loaded;
    a supply pipe rising at least one orifice for discharging the solid particles which is arranged on a side and/or horizontal wall, such that the means for supplying solid particles pours the solid particles substantially vertically into the supply pipe;
    a movable assembly arranged below the supply pipe entirely or partly inside the vessel, comprising:
      a driving means;
      a substantially vertical central shaft driven in rotation by the driving means, the substantially vertical shaft being surrounded at least partially by the supply pipe;
      at least one movable annular support which supports a first plurality of deflector elements, the at least one movable annular support being mounted in sliding fashion on the central shaft;
      at least one fixed annular support which supports a second plurality of deflector elements which are not supported by the at least one movable annular support; and
      at least one control rod fixed perpendicularly to a plane of the at least one movable annular support and a plane of the at least one fixed annular support, wherein the plane of the at least one movable annular support and the plane of the at least one fixed annular support are parallel to each other, such that the at least one movable annular support is connected to the at least one fixed annular support by the at least one control rod in a direction perpendicular to the parallel planes of the at least one movable annular support and the at least one fixed annular support,
    wherein the first and second plurality of deflector elements are integral in rotation with the shaft, arranged around the shaft on a plurality of vertical tiers, and articulated in such a way that the first and second plurality of deflector elements can lift up under the effect of the rotation of the movable assembly.

2. The device according to claim 1, characterized in that the movable assembly comprises a plurality of movable annular supports sliding on the central shaft independently of one another.

3. The device according to claim 2, characterized in that the device further comprises an orifice provided in either the at least one fixed annular support or the at least one movable annular support, such that the at least one control rod is movably present in the orifice, the at least one control rod being integral with the at least one fixed annular support or the at least one movable annular support that does not include the orifice, the distance between a first tier and a second tier of deflector elements, counted from the top of the device, being adjusted by sliding of the control rod.

4. The device according to claim 3, characterized in that the at least one control rod comprises at least one stop limiting the maximum spacing between the fixed and movable annular supports.

5. The device according to claim 3, characterized in that a spring is mounted around the at least one control rod such that the at least one control rod is compressed when the at least one movable annular support is brought closer to the at least one fixed annular support.

6. The device according to claim 1, characterized in that the device further comprises means for controlling the relative displacement of a plurality of movable annular supports to adjust the distance separating them.

7. A device for loading solid particles into a vessel, comprising:
    a means for supplying solid particles to be distributed, arranged on an upper part of a vessel to be loaded;
    a supply pipe comprising at least one orifice for discharging the solid particles which is arranged on a side and/or horizontal wall, such that the means for supplying solid particles pours the solid particles substantially vertically into the supply pipe;
    a movable assembly arranged below the supply pipe entirely or partly inside the vessel, comprising:
      a driving means;
      a substantially vertical central shaft driven in rotation by the driving means, the substantially vertical shaft being surrounded at least partially by the supply pipe;
      at least one movable annular support which supports a plurality of deflector elements, the at least one movable annular support being mounted in sliding fashion on the central shaft;
    wherein the plurality of deflector elements are integral in rotation with the shaft, arranged around the shaft on at least one of a plurality of vertical tiers, and articulated in such a way that the plurality of deflector elements can lift up under the effect of the rotation of the movable assembly, and
    the device further comprises at least one lever which exerts pressure on the at least one movable annular support, the lever comprising a vertical part that slides parallel to the central shaft and is articulated with an actuating arm, a free end of the vertical part bearing against an upper face of the at least one movable annular support.

8. A device for loading solid particles into a vessel, comprising:
- a means for supplying solid particles to be distributed, arranged on an upper part of a vessel to be loaded;
- a supply pipe comprising at least one orifice for discharging the solid particles which is arranged on a side and/or horizontal wall, such that the means for supplying solid particles pours the solid particles substantially vertically into the supply pipe;
- a movable assembly arranged below the supply pipe entirely or partly inside the vessel, comprising:
  - a driving means;
  - a substantially vertical central shaft driven in rotation by the driving means, the substantially vertical shaft being surrounded at least partially by the supply pipe;
  - at least one movable annular support which supports a plurality of deflector elements, the at least one movable annular support being mounted in sliding fashion on the central shaft;
- wherein the plurality of deflector elements are integral in rotation with the shaft, arranged around the shaft on at least one of a plurality of vertical tiers, and articulated in such a way that the plurality of deflector elements can lift up under the effect of the rotation of the movable assembly, and the device further comprises a ring surrounding the supply pipe and sliding along the supply pipe, on which is fixed at least one rod extending parallel to the central shaft in a direction of the deflector elements, a free end of the rod being shaped so as to bear against an upper face of the at least one movable annular support, and at least one screw bearing on the ring to displace the ring vertically.

9. A method for loading reactors comprising a step of: adjusting the position of the deflector elements on the central shaft and the rotational speed of the movable assembly depending on a loading height of the device according to claim 1.

10. The method for loading a reactor according to claim 9 further comprising a step of: adjusting the distance between a first and a second tier of deflector elements, wherein the first and the second tiers are counted from the top of the device.

11. The method for loading a reactor according to claim 10, wherein the distance between the first and the second tiers of deflector elements is at its maximum at the beginning of loading and at its minimum at the end of loading.

12. The method for loading a reactor according to claim 10, wherein the distance separating the first and second tiers of deflector elements is between 0 and 150 mm.

13. The method for loading a reactor according to claim 1, wherein a rotational speed of the deflector elements is between 25 and 250 rpm.

* * * * *